3 Sheets—Sheet 1.

B. SAUNDERS.

Assignor, by mesne assignments, to A. H. SAUNDERS.

Machine for Dressing or Sizing Yarn.

No. 8,117. Reissued March 12, 1878.

WITNESSES

Franck L. Durand

Mark Gall

INVENTOR

Benjamin Saunders

Alexander Mason

ATTORNEYS

N. PETERS, PHOTO-LITHOGRAPHER, WASHINGTON, D. C.

3 Sheets—Sheet 2.

B. SAUNDERS.

Assignor, by mesne assignments, to A. H. SAUNDERS.

Machine for Dressing or Sizing Yarn.

No. 8,117. Reissued March 12, 1878.

WITNESSES

Franck L. Durand

Hank Galt

INVENTOR

Benjamin Saunders

Alexander Simson

ATTORNEYS

N. PETERS, PHOTO-LITHOGRAPHER, WASHINGTON, D. C.

3 Sheets—Sheet 3.

B. SAUNDERS.

Assignor, by mesne assignments, to A. H. SAUNDERS.

Machine for Dressing or Sizing Yarn.

No. 8,117. Reissued March 12, 1878.

WITNESSES
P. L. Conrand
Hauk Gall

INVENTOR
Benj. Saunders.
Alexander Thomson
ATTORNEYS

N. PETERS, PHOTO-LITHOGRAPHER, WASHINGTON, D. C.

UNITED STATES PATENT OFFICE.

BENJAMIN SAUNDERS, OF NASHUA, NEW HAMPSHIRE, ASSIGNOR, BY MESNE ASSIGNMENTS, TO A. H. SAUNDERS.

IMPROVEMENT IN MACHINES FOR DRESSING OR SIZING YARN.

Specification forming part of Letters Patent No. 43,627, dated July 19, 1864; Reissue No. 8,117, dated March 12, 1878; application filed February 9, 1878.

*To all whom it may concern:*

Be it known that I, BENJAMIN SAUNDERS, of Nashua, in the county of Hillsborough and State of New Hampshire, have invented certain new and useful Improvements in Machines for Dressing or Sizing Yarn; and I do hereby declare that the following is a full, clear, and exact description thereof, reference being had to the accompanying drawings, and to the letters of reference marked thereon, which form a part of this specification.

This invention consists in the combination of a rotary or other pump and a series of pipes, of galvanized iron or other suitable material, with the mixing-tank, or with a reservoir connected therewith, and with the several dresser-boxes, in such a manner that the sizing contained in the mixing-tank can be easily and readily forced through the pipes to the several dresser-boxes without the use of pails, dippers, or other similar implements; and also, by the constant current passing from the reservoir over all the dressers and back, a thorough equalization and a continuous mixing of the sizing is effected.

Figure 1:
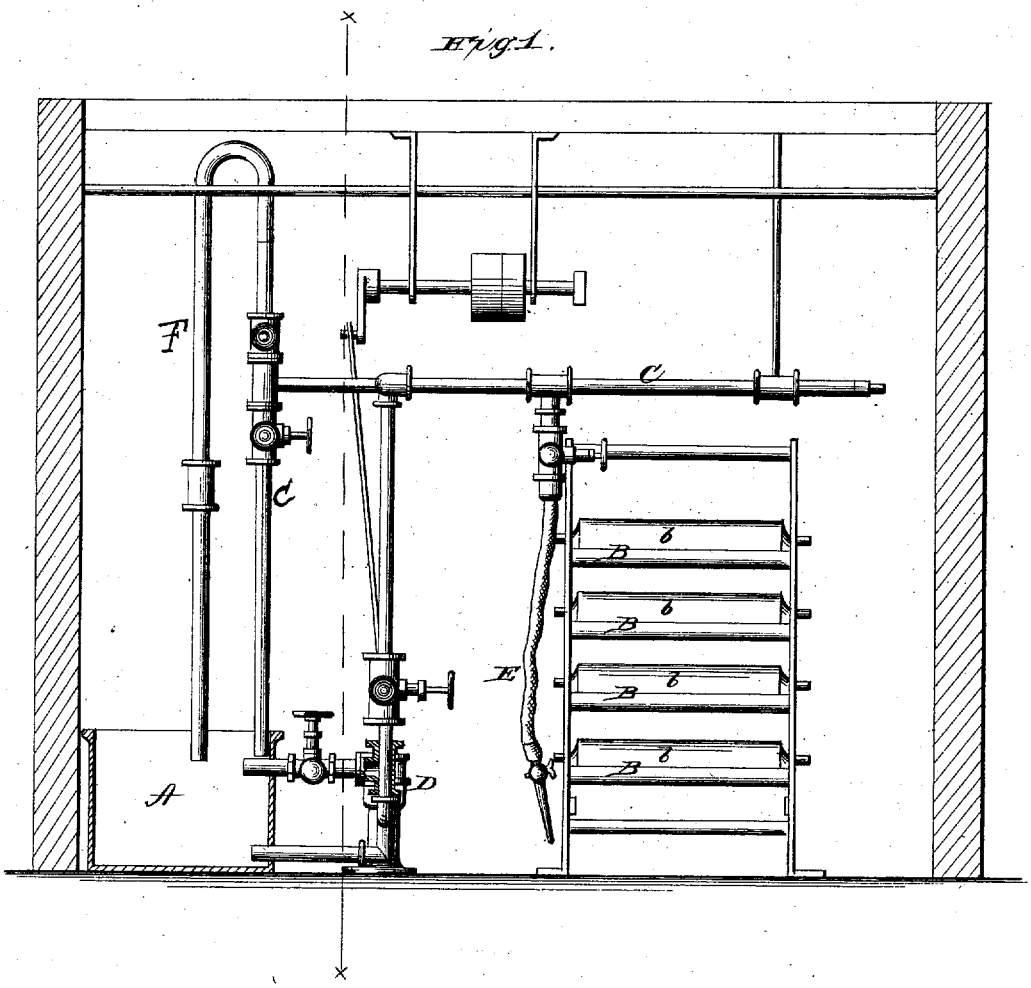
Figure 2:
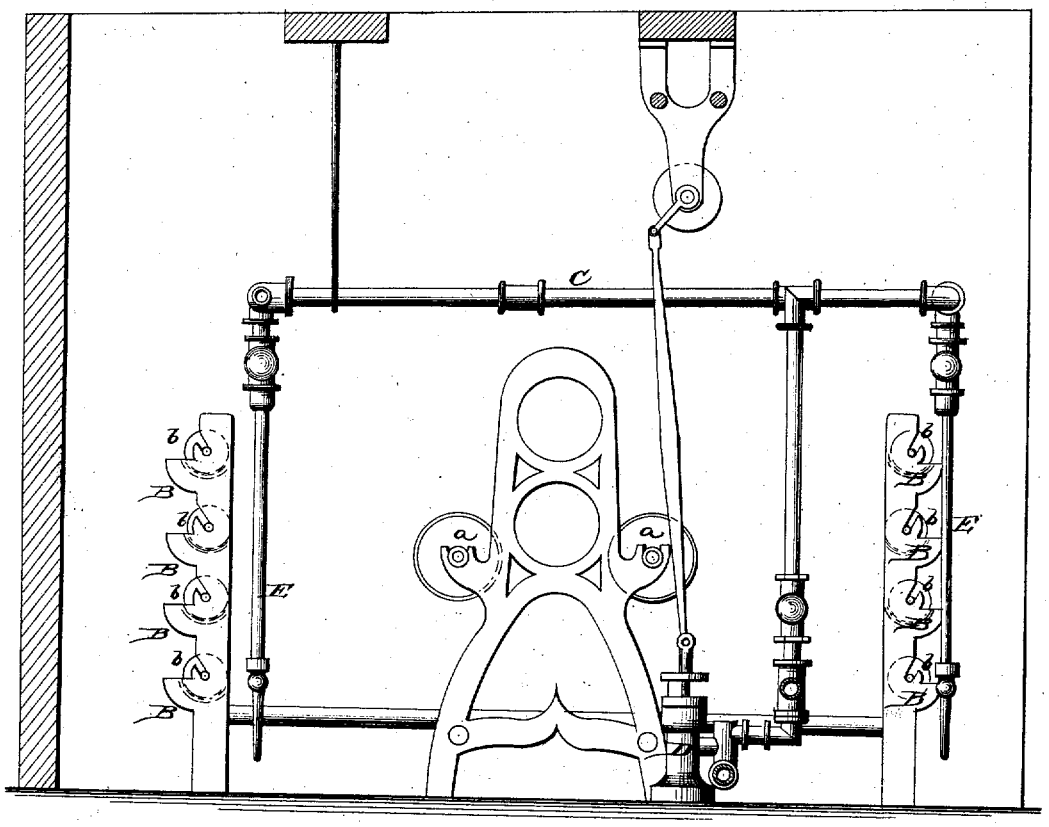
Figure 3:
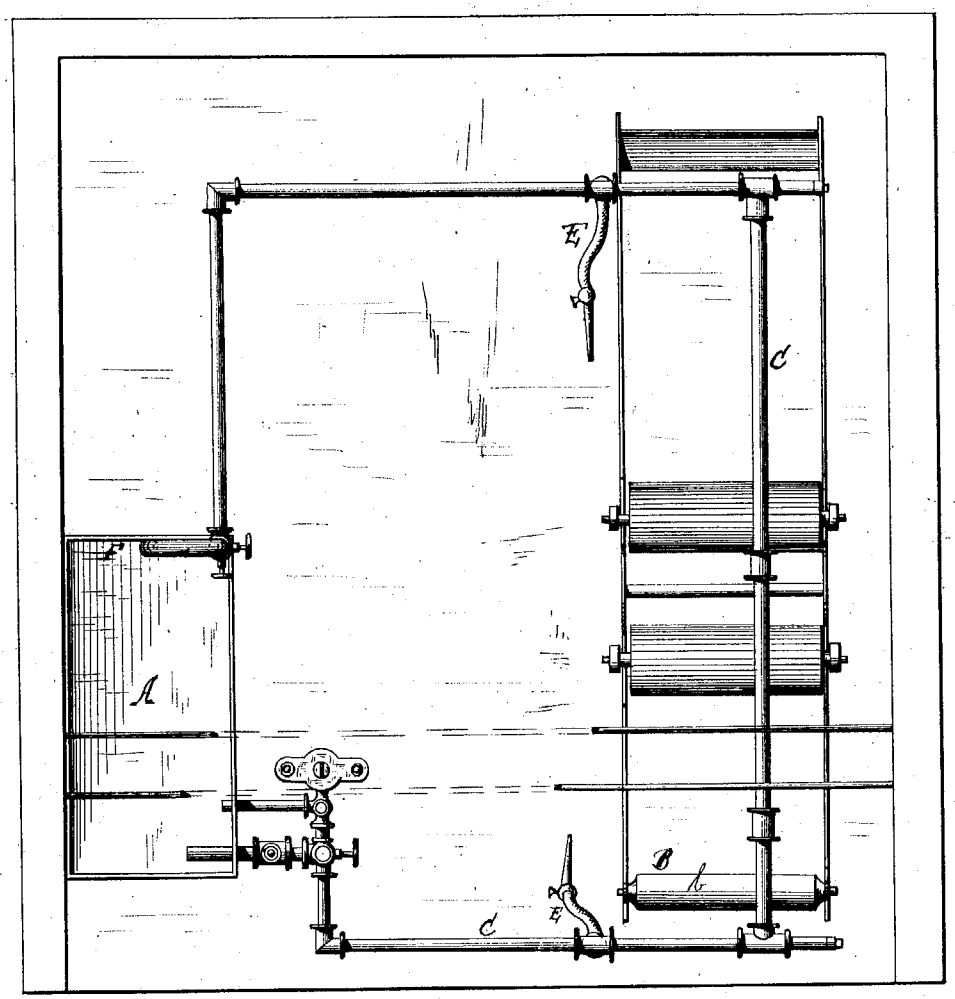

In the annexed drawings, Figure 1 represents a transverse vertical section of my invention. Fig. 2 is a longitudinal vertical section of the same, the line *x x*, Fig. 1, indicating the plane of section. Fig. 3 is a plan view, showing the pipes.

A represents a mixing-tank, or a reservoir connected with said mixing-tank, from which the sizing is distributed to the several dresser-boxes B.

The dressers are constructed, in the usual manner, with drums *a* and a series of sizing-rollers, *b*, which run in boxes B, and said boxes are arranged one above the other, as represented in the drawing; or they may be placed in any other convenient position in relation to each other. Two or more dressers are arranged in line with each other, or side by side, or in any other convenient position, and a pipe, C, extends above and adjacent to the entire series, as clearly shown in the drawing. This pipe connects at one end with a pump, D, which communicates with the mixing tank or reservoir A, and which is so arranged that by its action the contents of the tank can be forced through the pipe. The opposite end of said pipe leads back into the tank, and also connects with the bent tube F, and one or more flexible discharge-pipes, E, serve to introduce the sizing into the several dresser-boxes.

Suitable stop-cocks, inserted into the pipe C and its connections at various points, enable the operator to control the current of liquid passing through said pipe.

By the action of the pump, which may be of any suitable construction, the sizing from the mixing tank or reservoir connected therewith can be conveyed to the dresser-boxes in the easiest possible manner.

The pump can be readily rigged up so that it will be operated by power, and no hand-labor required for the purpose of conveying the sizing to the dresser-boxes, except that necessary to direct the discharge-spouts to the proper spot.

All tubs, pails, ladles, &c., usually employed for the purpose of conveying the sizing, and the consequent waste which is all but unavoidable in using tubs, pails, and ladles, is entirely avoided by my method of conveying the sizing to the dresser-boxes; and, furthermore, in consequence of the continuous current of sizing through the reservoir and pipes, a perfect and uniform consistency of the sizing is effected, and the yarn is sized uniformly throughout, and its tendency to chafe in the loom is lessened.

In order to obtain the desired pressure at the moment the branch valves are opened to let the sizing into the various troughs or boxes, the pipe C, on returning to the reservoir, connects with a bent tube, F, as clearly shown in Fig. 1.

Having thus fully described my invention, what I claim as new, and desire to secure by Letters Patent, is—

1. The combination, with the sizing tank or reservoir and the dresser-boxes of a sizing-machine, of a pump and suitable pipes for conveying the sizing from the tank or reservoir to the boxes, substantially as herein set forth.

2. A return-pipe, C, in combination with the pump D and size-tank A, or a reservoir connected therewith, substantially as herein specified, for the purpose of keeping the size in continuous motion and distributing it in a simple and easy manner.

3. The bent tube F, in combination with the return-pipe C, pump D, and tank A, substantially as herein specified, for the purpose of giving the requisite pressure at the moment of opening the branch valves to let the size into the various boxes or troughs.

In testimony that I claim the foregoing I have hereunto set my hand and seal this 25th day of January, 1878.

BENJAMIN SAUNDERS. [L. S.]

Witnesses:
J. P. S. OTTERSON,
J. M. SMITH.